(12) United States Patent
Li et al.

(10) Patent No.: US 8,978,528 B2
(45) Date of Patent: Mar. 17, 2015

(54) METHOD FOR CUTTING PANEL SUBSTRATE AND SUBSTRATE CUTTING APPARATUS

(75) Inventors: Dong Li, Shenzhen (CN); Feng She, Shenzhen (CN); Cheng-ming Huang, Shenzhen (CN)

(73) Assignee: Shenzhen China Star Optoelectronics Technology Co., Ltd., Guangdong (CN)

( * ) Notice: Subject to any disclaimer, the term of this patent is extended or adjusted under 35 U.S.C. 154(b) by 481 days.

(21) Appl. No.: 13/375,476

(22) PCT Filed: Sep. 26, 2011

(86) PCT No.: PCT/CN2011/080149
§ 371 (c)(1), (2), (4) Date: Nov. 30, 2011

(87) PCT Pub. No.: WO2013/020320
PCT Pub. Date: Feb. 14, 2013

(65) Prior Publication Data
US 2013/0033672 A1    Feb. 7, 2013

(30) Foreign Application Priority Data
Aug. 5, 2011    (CN) .......................... 2011 1 0223726

(51) Int. Cl.
*B26D 7/00* (2006.01)
*G02F 1/13* (2006.01)
(Continued)

(52) U.S. Cl.
CPC .. *B26D 1/10* (2013.01); *B26D 3/06* (2013.01); *G02F 1/1303* (2013.01); *G02F 1/133351* (2013.01); *B26D 11/00* (2013.01)
USPC .................. 83/36; 83/648; 83/885; 349/187; 29/426.3; 225/2

(58) Field of Classification Search
CPC ... G02F 1/13; G02F 1/133351; G02F 1/1303; B26D 1/10; B26D 11/00; B26D 3/06; B28D 5/0011; C03B 33/07; C03B 33/03; C03B 33/0207; C03B 33/1033; C03B 33/076; B65G 2249/045; B65G 49/066; B65G 2249/04; H01J 9/52; H01J 2217/49
USPC .............. 83/36, 648, 13, 883, 885, 100, 886, 83/887, 51; 349/187, 158, 190; 29/426.3, 29/426.4, 426.5, 700, 791, 284; 225/2, 225/96.5, 94, 96, 97, 103–105
See application file for complete search history.

(56) References Cited

U.S. PATENT DOCUMENTS 2,498,991 A * 2/1950 Gibson ............................... 16/5
3,279,664 A * 10/1966 Lynch .......................... 225/96.5
(Continued)

FOREIGN PATENT DOCUMENTS

| CN | 1439497 | 9/2003 |
|---|---|---|
| CN | 1468695 | 1/2004 |

(Continued)

*Primary Examiner* — Ghassem Alie

(57) ABSTRACT

The present invention provides a method for cutting a panel substrate and a substrate cutting apparatus. The substrate cutting apparatus comprises a first cutting unit and a second cutting unit. The method comprises the following steps: cutting off a first residual material and a second residual material at two opposite sides of the panel substrate; cutting off a third residual material and a fourth residual material at another two opposite sides of the panel substrate; cutting the panel substrate into a plurality of elongated substrates; and cutting each of the elongated substrates into the panel units. The present invention can reduce a process time for cutting the panel substrate.

4 Claims, 9 Drawing Sheets

(51) Int. Cl.
*B26D 1/10* (2006.01)
*B26D 3/06* (2006.01)
*G02F 1/1333* (2006.01)
*B26D 11/00* (2006.01)

(56) References Cited

U.S. PATENT DOCUMENTS 3,286,893 A * 11/1966 Zellers, Jr. .................. 225/2
5,873,922 A * 2/1999 Lisec ........................... 65/112
6,795,154 B2 9/2004 Uh et al.
2007/0044606 A1* 3/2007 Kang et al. .................. 83/13
2009/0316081 A1 12/2009 Nishida et al.
2010/0288101 A1* 11/2010 Iwamoto et al. ............. 83/883
2011/0049781 A1* 3/2011 Lewalski et al. ........ 270/58.07
2011/0062641 A1* 3/2011 Sato et al. .................. 269/21

FOREIGN PATENT DOCUMENTS

| | | |
|---|---|---|
| CN | 1920632 | 2/2007 |
| CN | 101579854 | 11/2009 |
| JP | 2002182178 | 6/2002 |
| JP | 2006181757 | 7/2006 |

* cited by examiner

METHOD FOR CUTTING PANEL SUBSTRATE AND SUBSTRATE CUTTING APPARATUS

FIELD OF THE INVENTION

The present invention relates to a method for cutting a panel substrate and a substrate cutting apparatus, and more particularly to a method for cutting a display panel substrate and a substrate cutting apparatus for display panels.

BACKGROUND OF THE INVENTION

Liquid crystal displays (LCDs) have been widely applied in electrical products. Currently, most of LCDs are backlight type LCDs which comprise a liquid crystal panel and a backlight module. The liquid crystal panel is composed of two transparent substrates and a liquid crystal sealed there-between. In a manufacturing process of the display panel, a large substrate can be cut into a plurality of panel units of a suitable size.

In general, a panel cutting machine includes a first cutting unit and a second cutting unit. The first cutting unit is disposed for cutting along only a single direction, and the second cutting unit is disposed for cutting along another direction. In the first cutting unit, the large substrate is cut into a plurality of smaller elongated substrates. Subsequently, in the second cutting unit, each elongated substrate is cut into a plurality of panel units.

However, in the second cutting unit, several cutting steps are required to be performed to cut each elongated substrate into the panel units. In the above-mentioned cutting process, it is required to spend most time for the second cutting unit, hence affecting the whole process time of the display panel.

As a result, it is necessary to provide a method for cutting a panel substrate and a substrate cutting apparatus to solve the problems existing in the conventional technologies, as described above.

SUMMARY OF THE INVENTION

The present invention provides a method for cutting a panel substrate and a substrate cutting apparatus to solve the problems existing in the conventional substrate cutting machine.

A primary object of the present invention is to provide a method for cutting a panel substrate into a plurality of panel units, wherein the method comprises the following steps: cutting off a first residual material and a second residual material at two opposite sides of the panel substrate; cutting off a third residual material and a fourth residual material at another two opposite sides of the panel substrate; cutting the panel substrate into a plurality of elongated substrates; and cutting each of the elongated substrates into the panel units.

Another object of the present invention is to provide a substrate cutting apparatus for cutting a panel substrate into a plurality of panel units, wherein the substrate cutting apparatus comprises: a rotatable stage configured to rotate the panel substrate; a first cutting unit configured to cut off a first residual material, a second residual material, a third residual material and a fourth residual material of the panel substrate, and to cut the panel substrate into a plurality of elongated substrates; and a second cutting unit configured to cut each of the elongated substrates into the panel units.

Still another object of the present invention is to provide a substrate cutting apparatus for cutting a panel substrate into a plurality of panel units, wherein the substrate cutting apparatus comprises: a pre-cutting unit configured to pre-cut off a first residual material and a second residual material of the panel substrate; a first cutting unit configured to cut off a third residual material and a fourth residual material of the panel substrate, and to cut the panel substrate into a plurality of elongated substrates; and a second cutting unit configured to cut each of the elongated substrates into the panel units.

In one embodiment of the present invention, the method further comprises the following steps: utilizing a first cutting unit to cut off the first residual material of the panel substrate; rotating the panel substrate by 180°; and utilizing the first cutting unit to cut off the second residual material of the panel substrate.

In one embodiment of the present invention, when cutting off the first residual material, the panel substrate is transported to a rotatable stage, and then the panel substrate is fixed and held by the rotatable stage and the first cutting unit, and the first residual material at a first side of the panel substrate is cut off by the first cutting unit.

In one embodiment of the present invention, after using the first cutting unit to cut off the first residual material, the panel substrate fixed by the rotatable stage and the first cutting unit is released, and the rotatable stage is utilized to rotate the panel substrate by 180°.

In one embodiment of the present invention, the method further comprises the following steps: when cutting off the third residual material and the fourth residual material and cutting the panel substrate into the elongated substrates, the panel substrate is rotated by 90°; and utilizing the first cutting unit to cut the panel substrate, so as to cut off the third residual material and the fourth residual material and cut the panel substrate into the elongated substrates.

In one embodiment of the present invention, a second cutting unit is utilized to cut each of the elongated substrates into the panel units.

In one embodiment of the present invention, the first residual material and the second residual material is cut off by a pre-cutting unit.

In one embodiment of the present invention, the rotatable stage comprises: a support platform configured to carry the panel substrate; a driving motor configured to rotate the support platform; a lift cylinder configured to lift or lower the support platform; and a servo motor configured to linearly move the support platform.

In one embodiment of the present invention, the pre-cutting unit comprises: a cutting plane configured to carry the panel substrate; and a plurality of cutters including cutter heads configured to cut the panel substrate.

In one embodiment of the present invention, the cutters are disposed at both sides of the cutting plane, and there is a predetermined space between the cutters at both sides thereof.

In comparison with the problems existing in the conventional substrate cutting machine, the method and the substrate cutting apparatus for cutting the panel substrate of the present invention can greatly reduce steps for cutting the panel substrate, thereby greatly reducing the cutting time for the panel substrate.

The structure and the technical means adopted by the present invention to achieve the above and other objects can be best understood by referring to the following detailed description of the preferred embodiments and the accompanying drawings.

DETAILED DESCRIPTION OF THE PREFERRED EMBODIMENTS

Figure 1:
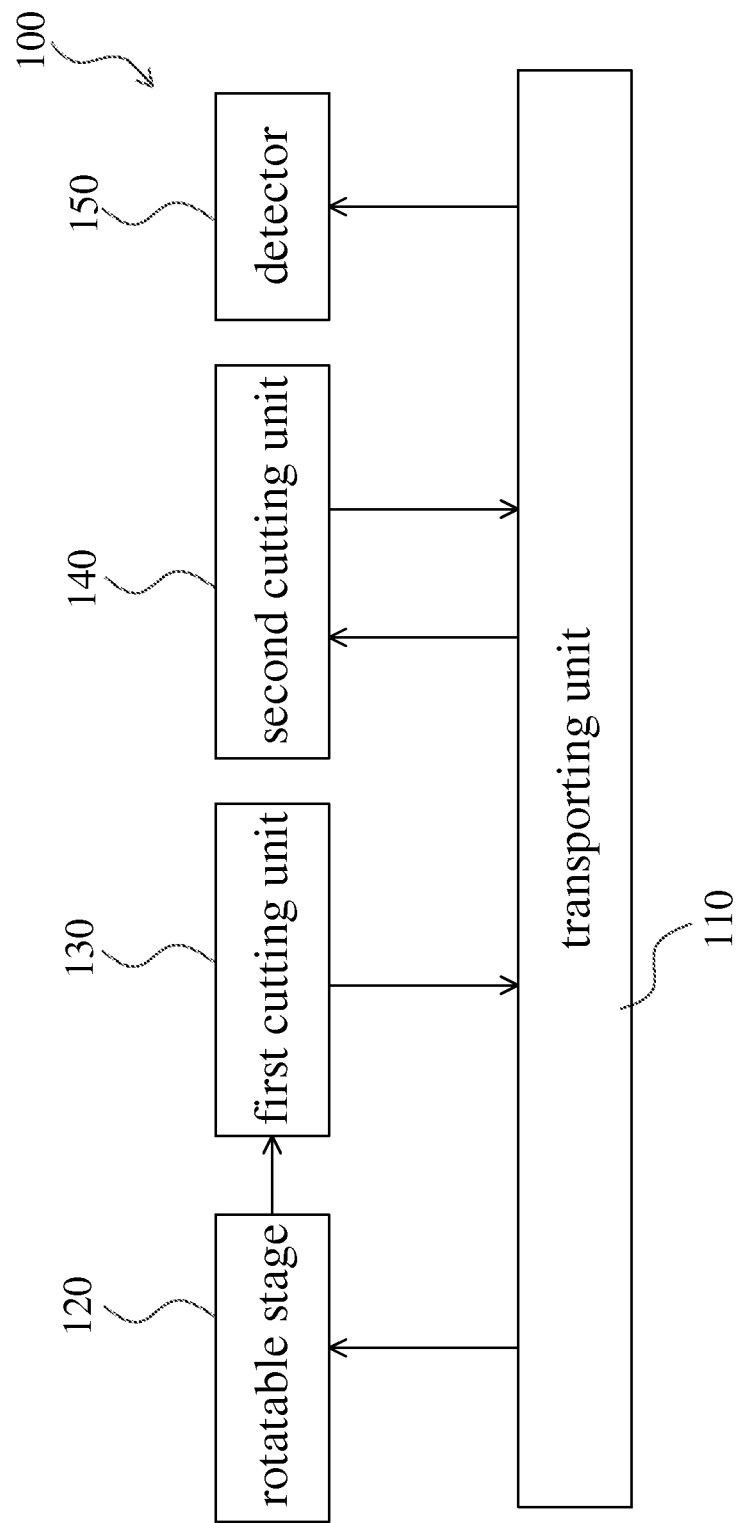
FIG. 1 is a schematic diagram showing a substrate cutting apparatus according to a first embodiment of the present invention.

The following embodiments are referring to the accompanying drawings for exemplifying specific implementable embodiments of the present invention. Furthermore, directional terms described by the present invention, such as upper, lower, front, back, left, right, inner, outer, side and etc., are only directions by referring to the accompanying drawings, and thus the used directional terms are used to describe and understand the present invention, but the present invention is not limited thereto.

In the drawings, structure-like elements are labeled with like reference numerals.

Figure 2:
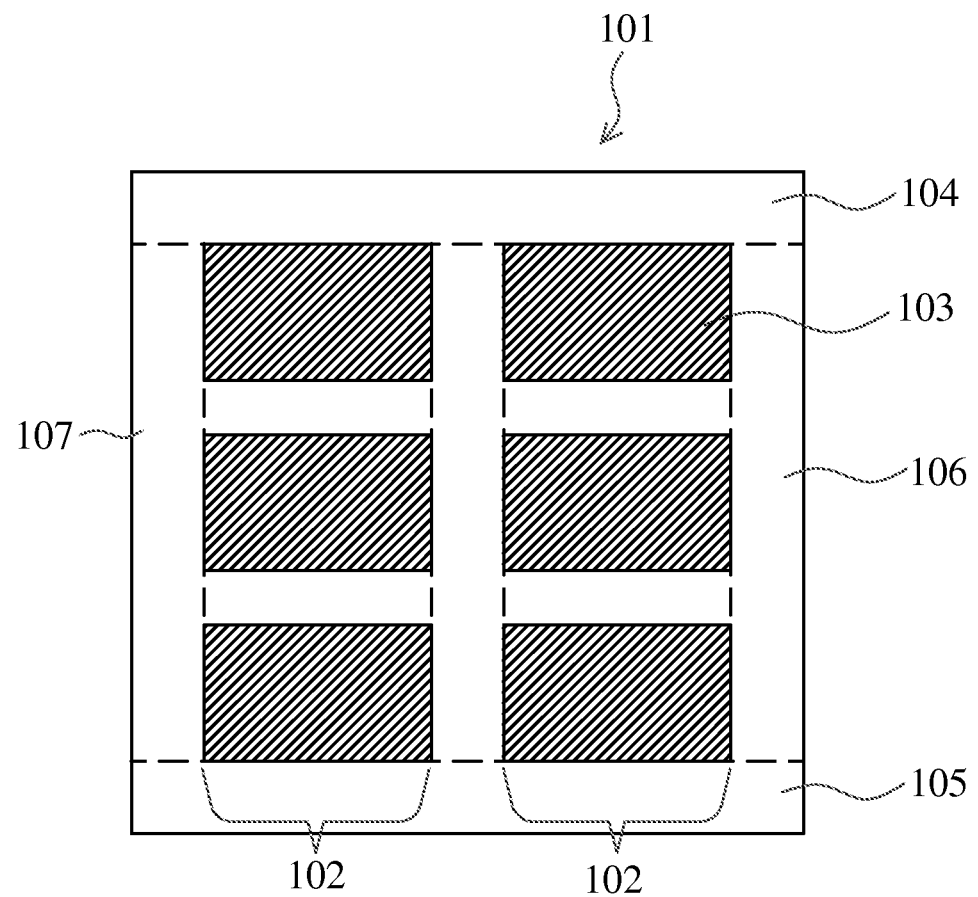
FIG. 2 is a schematic diagram showing a panel substrate according to the first embodiment of the present invention.

Referring to FIG. 1 and FIG. 2, FIG. 1 is a schematic diagram showing a substrate cutting apparatus according to a first embodiment of the present invention, and FIG. 2 is a schematic diagram showing a panel substrate according to the first embodiment of the present invention. The substrate cutting apparatus 100 is configured to cut the larger panel substrate 101 into a plurality of smaller panel units 103, wherein the larger panel substrate 101 may be a glass substrate or a flexible substrate. The panel units 103 can be used to manufacture display panels which may be applicable to different displays, such as liquid crystal display, (LCD), organic light emission diode (OLED) display, plasma display panel, or field emission display. When the panel units 103 are, for example, LCD panels, the panel substrate 101 can be assembled of a glass substrate with color filters (CF) and a glass substrate with a thin film transistor (TFT) array.

Referring to FIG. 1 again, the substrate cutting apparatus 100 comprises at least one transporting unit 110, a rotatable stage 120, a first cutting unit 130, a second cutting unit 140 and a detector 150. The transporting unit 110 is configured to transport the panel substrate 101. The transporting unit 110 may includes chucks, suckers, rollers or robot arms for transporting the panel substrate 101. The rotatable stage 120 is configured to rotate the panel substrate 101, so as allow the first cutting unit 130 to cut the panel substrate 101 at different sides thereof. In this case, the rotatable stage 120 can rotate the panel substrate 101 by any angle, such as 90°, 180°, 270° and 360°. The first cutting unit 130 is disposed downstream of the rotatable stage 120 for cutting off residual materials around the panel substrate 101 and cutting the panel substrate 101 into a plurality of elongated substrates 102. The second cutting unit 140 is disposed downstream of the first cutting unit 130 for cutting each of the elongated substrates 102 into the panel units 103. The detector 150 is disposed downstream of the second cutting unit 140 for detecting whether the obtained panel units 103 are qualified for a predetermined quality requirement.

Figure 3:
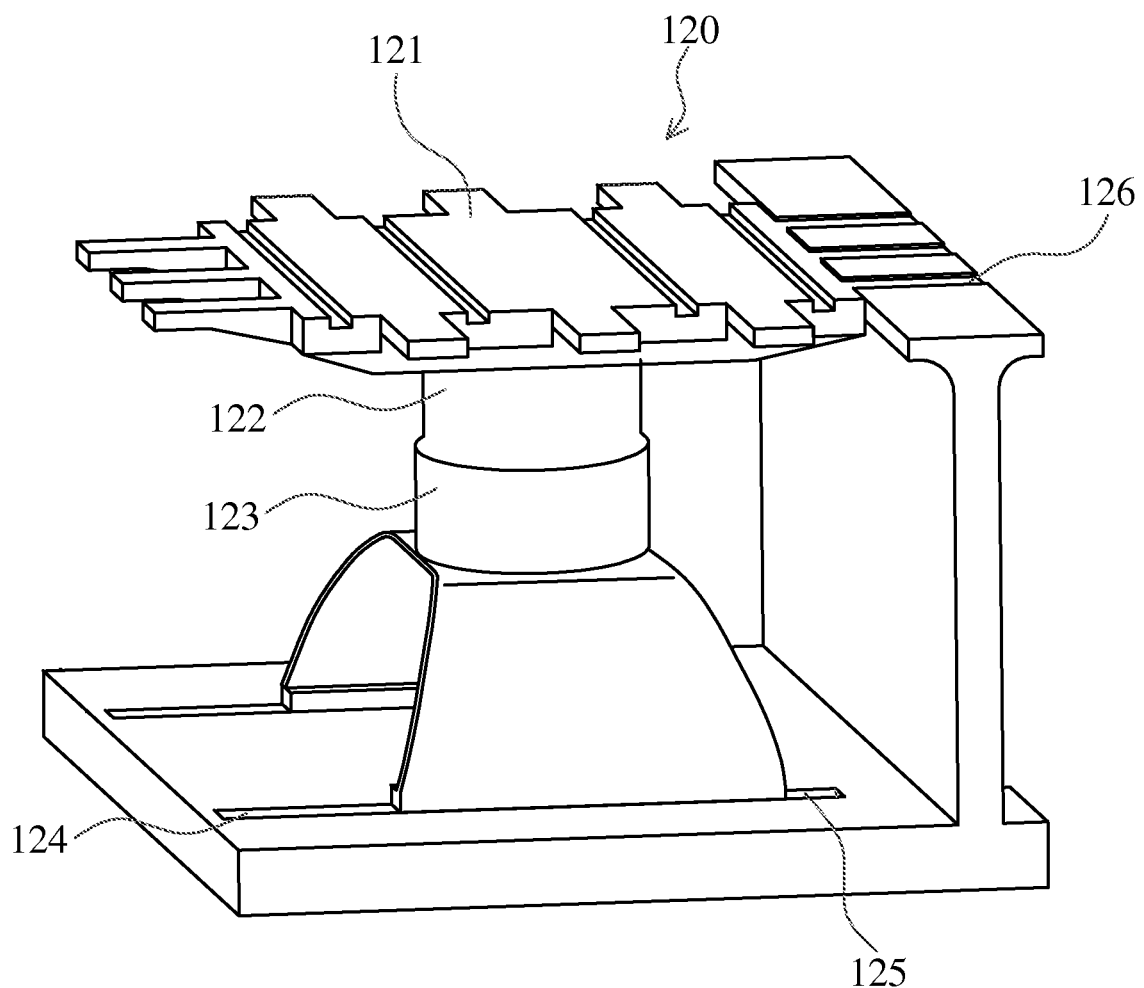
FIG. 3 is a schematic diagram showing a rotatable stage according to the first embodiment of the present invention.

Referring to FIG. 3, a schematic diagram showing the rotatable stage according to the first embodiment of the present invention is illustrated. In this embodiment, the rotatable stage 120 includes a support platform 121, a driving motor 122, a lift cylinder 123, ball screws 124, a servo motor 125 and a sucking fixed stage 126. The support platform 121 is configured to carry the panel substrate 101. The driving motor 122 is configured to rotate the support platform 121 for rotating the panel substrate 101. The lift cylinder 123 is configured to lift or lower the support platform 121 for lifting or lowering the panel substrate 101. The cooperation of the ball screws 124 and the servo motor 125 is configured to linearly move the support platform 121 for moving the panel substrate 101. The sucking fixed stage 126 is configured to hold the panel substrate 101.

Referring to FIG. 2 and FIGS. 4A to 4D, FIGS. 4A to 4D are schematic diagrams showing the panel substrate being cut by the substrate cutting apparatus according to the first embodiment of the present invention. A method for cutting the panel substrate 101 comprises the following steps: cutting off a first residual material 104 and a second residual material 105 at two opposite sides of the panel substrate 101; cutting off a third residual material 106 and a fourth residual material 107 at another two opposite sides of the panel substrate 101; cutting the panel substrate 101 into the elongated substrates 102; and cutting each of the elongated substrates 102 into the panel units 103. In this case, the residual materials around the panel substrate 101 are the materials which can not act as the panel units 103.

Figure 4A:
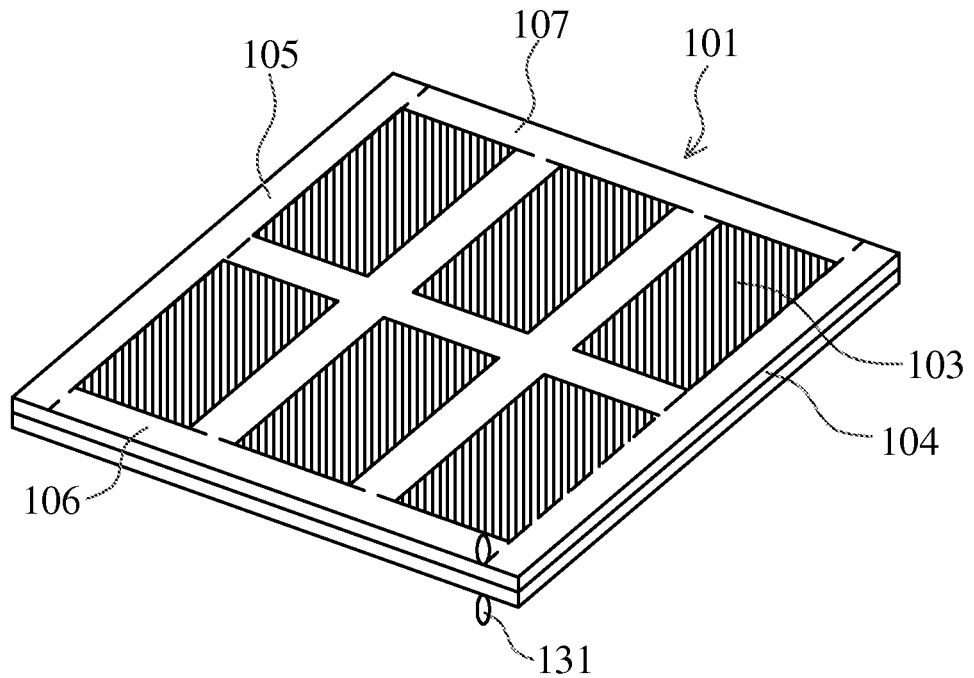
FIGS. 4A to 4D are schematic diagrams showing the panel substrate being cut by the substrate cutting apparatus according to the first embodiment of the present invention.
Figure 4B:
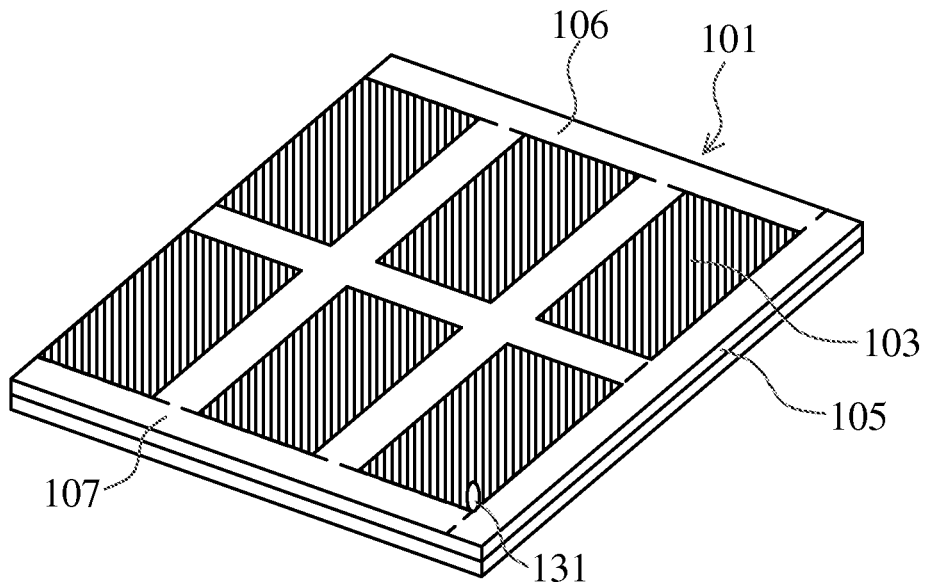
Figure 4C:
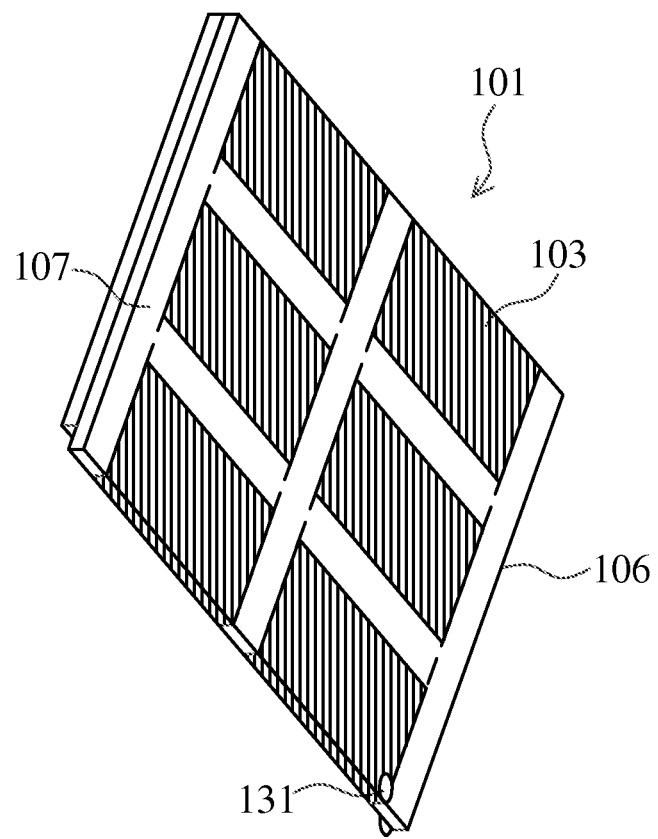
Figure 4D:
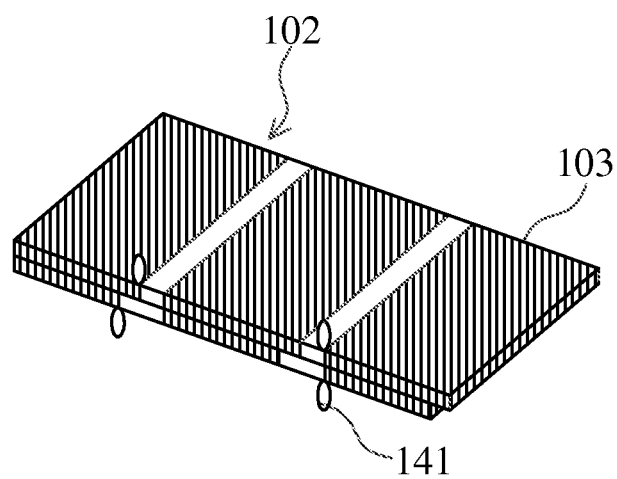

Referring to FIG. 4A and FIG. 4B again, when cutting off the first residual material 104 and the second residual material 105, first, the panel substrate 101 is transported to the rotatable stage 120 by the transporting unit 110, and then the panel substrate 101 is fixed and held by the rotatable stage 120 and the first cutting unit 130, and the first residual material 104 at a first side of the panel substrate 101 is cut off by the first cutting unit 130. At this time, a sucking fixed stage (not shown) of the first cutting unit 130 and the sucking fixed stage 126 of the rotatable stage 120 can hold and fix the panel substrate 101, so as to allow cutter heads 131 of the first cutting unit 130 to cut the panel substrate 101 (referring to FIG. 4A and FIG. 4B again). Furthermore, before cutting the panel substrate 101, at least one alignment device (not shown, such as CCD) of the first cutting unit 130 can be configured to align the panel substrate 101. Subsequently, after using the first cutting unit 130 to cut off the first residual material 104, the panel substrate 101 fixed by the rotatable stage 120 and the first cutting unit 130 is released, and the rotatable stage 120 is utilized to rotate the panel substrate 101 by 180°. Subsequently, the first cutting unit 130 is utilized to cut off the second residual material 105 at a second side of the panel substrate 101, wherein the second side of the panel substrate 101 is parallel to the first side thereof. At this time, the first cutting unit 130 and the rotatable stage 120 can fix and hold the panel substrate 101, and the alignment device of the first cutting unit 130 can align the panel substrate 101.

Referring to FIG. 4C again, when cutting off the third residual material 106 and the fourth residual material 107 and cutting the panel substrate 101 into the elongated substrates 102, first, the rotatable stage 120 is utilized to rotate the panel substrate 101 by 90° for cutting the substrate along different directions. Subsequently, the transporting unit 110 can transport the panel substrate 101 along a feed direction. At this time, the first cutting unit 130 is utilized to cut the panel substrate 101 repeatedly along a first cutting direction, thereby cutting off the third residual material 106 and the fourth residual material 107 and cutting the panel substrate 101 into the elongated substrates 102.

Referring to FIG. 4D again, when cutting each of the elongated substrates 102 into the panel units 103, the transporting unit 110 can transport the elongated substrates 102 to the second cutting unit 140. Subsequently, cutter heads 141 (referring to FIG. 4D) of the second cutting unit 140 can cut each of the elongated substrates 102 repeatedly along a second cutting direction, so as to obtain the panel units 103, wherein the second cutting direction of the second cutting unit 140 is vertical to the first cutting direction of the first cutting unit 130. Subsequently, the transporting unit 110 can transport the panel units 103 to the detector 150 for detecting the cut panel units 103.

Before utilizing the second cutting unit 140 to cut the elongated substrates 102, the residual materials (the first residual material 104 and the second residual material 105) at both sides of each of the elongated substrates 102 have been cut off previously and efficiently by the first cutting unit 130. In comparison with the conventional panel cutting process, the cutting time of the first cutting unit 130 increases, but by and large, the substrate cutting apparatus 100 of the present embodiment can reduce the cutting steps of utilizing the second cutting unit 140 to cut off the residual materials of each of the elongated substrates 102, thereby improving the whole cutting process and greatly raising a cutting efficiency. For example, in a cutting process for three elongated substrates 102, six steps of cutting off the residual materials can be omitted by using the substrate cutting apparatus 100 of the present embodiment. Therefore, the residual materials around the panel substrate 101 can be pre-cut off by the first cutting unit 130 of the substrate cutting apparatus 100 of the present embodiment efficiently for greatly reducing the steps and required time for cutting the panel substrate. For example, in this embodiment, a tact time for cutting the substrate can be reduced from 16.59 seconds to 13.73 seconds, thereby obtaining a raise of 17.2% of the cutting efficiency.

Figure 5:
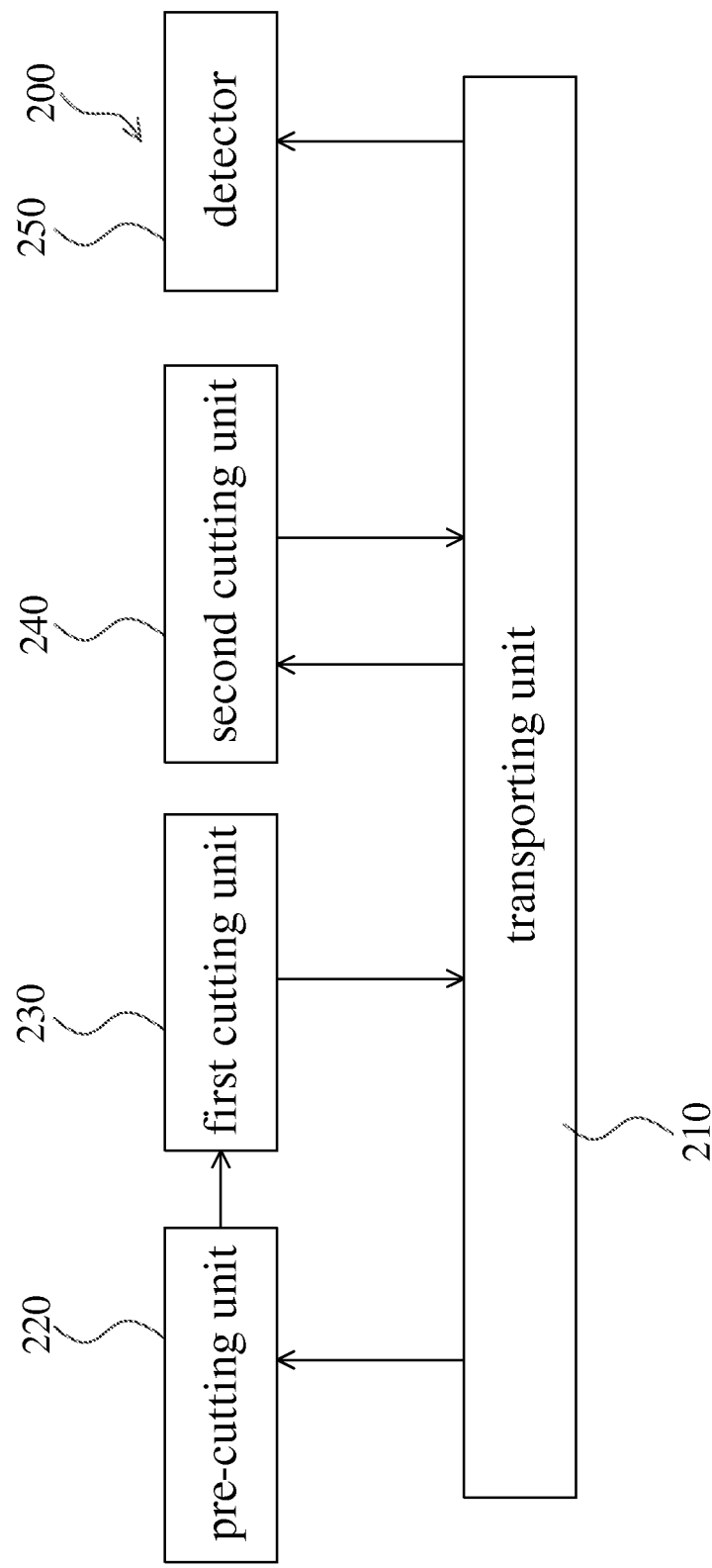
FIG. 5 is schematic diagram showing a substrate cutting apparatus according to a second embodiment of the present invention.

Referring to FIG. 5 and FIG. 7, schematic diagrams showing a substrate cutting apparatus according to a second embodiment of the present invention are illustrated. The substrate cutting apparatus 200 of the second embodiment comprises at least one transporting unit 210, a pre-cutting unit 220, a first cutting unit 230, a second cutting unit 240 and a detector 250. The transporting unit 210 is configured to transport the panel substrate 201. The transporting unit 210 may includes chucks, suckers, rollers or robot arms for transporting the panel substrate 201. The pre-cutting unit 220 is configured to pre-cut a first residual material 204 and a second residual material 205 of the panel substrate 201. The first cutting unit 230 is disposed downstream of the pre-cutting unit 220 for cutting off a third residual material 206 and a fourth residual material 207 of the panel substrate 201 and cutting the panel substrate 201 into a plurality of elongated substrates 202. The second cutting unit 240 is disposed downstream of the first cutting unit 230 for cutting each of the elongated substrates 202 into the panel units 203. The detector 250 is disposed downstream of the second cutting unit 240 for detecting whether the obtained panel units 203 are qualified for a predetermined quality requirement.

Figure 6:
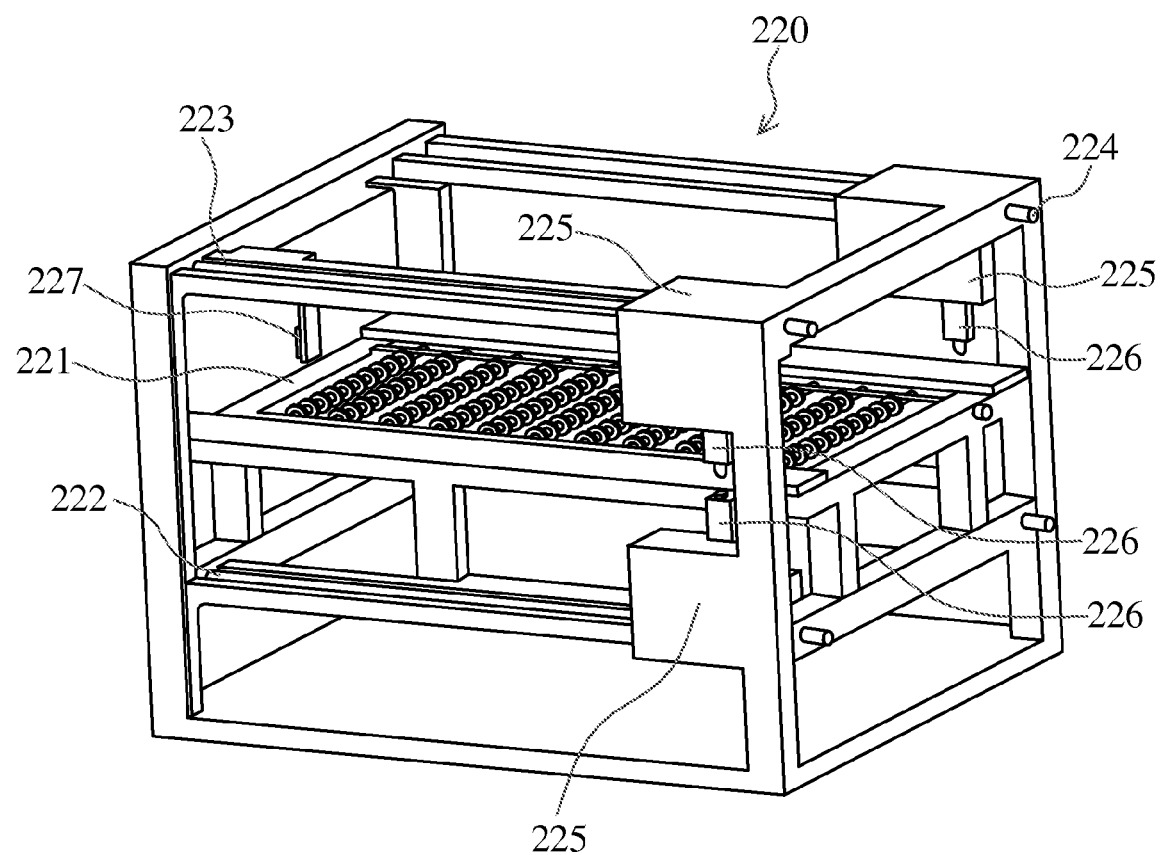
FIG. 6 is a schematic diagram showing a pre-cutting unit according to the second embodiment of the present invention.

Referring to FIG. 6, a schematic diagram showing the pre-cutting unit according to the second embodiment of the present invention is illustrated. In the second embodiment, the pre-cutting unit 220 includes a cutting plane 221, ball screws 222, guiding rails 223, driving motors 224, four cutters 225, four cutter heads 226 and at least one alignment device 227. The cutting plane 221 is configured to carry the panel substrate 201. The cutters 225 are disposed on the ball screws 222 and the guiding rails 223, respectively. The driving motors 224 are, such as servo motors, configured to drive the ball screws 222 for moving the cutters 225. The cutter heads 226 are disposed on the cutters 225 configured to cut the panel substrate 201. In this case, there is a predetermined space between the cutters 225 at both sides of the cutting plane 221, so as to drive the cutters 225 at both sides thereof to cut off the first residual material 204 and the second residual material 205 simultaneously. A plurality of alignment devices 227 may be disposed around the cutting plane 221. The alignment devices 227 may be charge-coupled devices (CCD) configured to capture images of alignment marks on the panel substrate 201 for alignment.

Figure 7A:
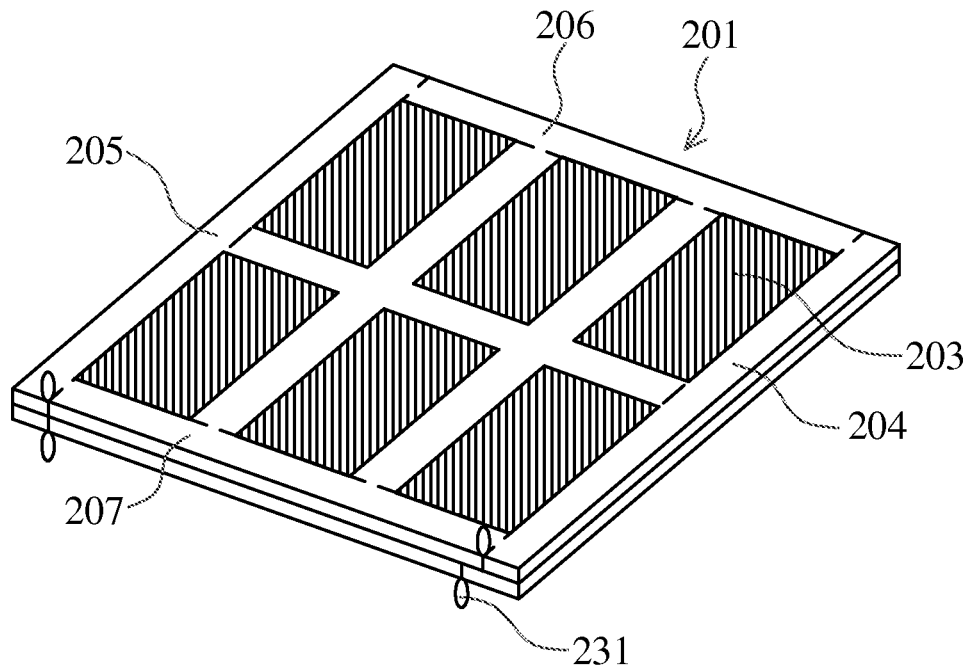
FIGS. 7A to 7C are schematic diagrams showing the panel substrate being cut by the substrate cutting apparatus according to a second embodiment of the present invention.
Figure 7B:
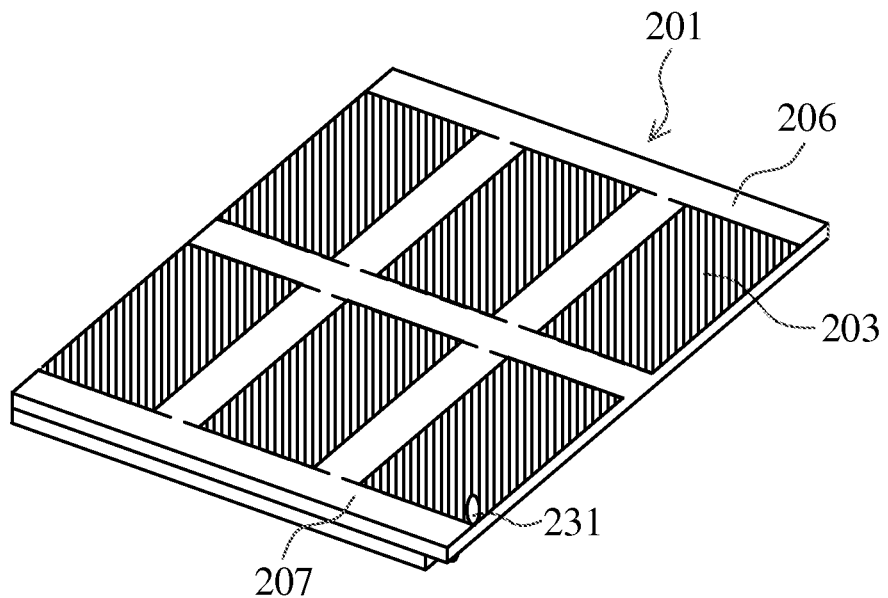
Figure 7C:
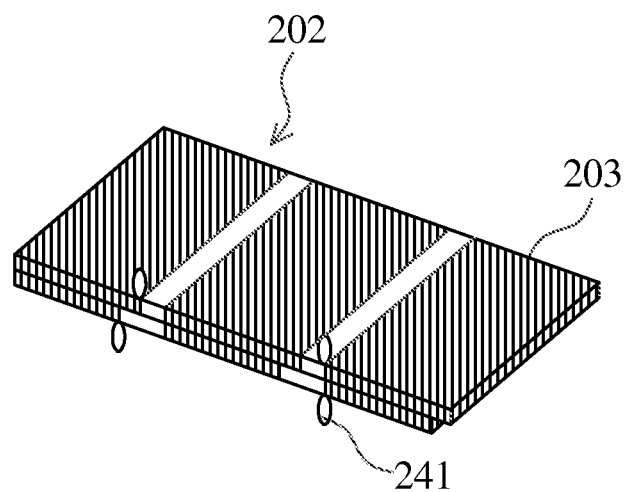

Referring to FIGS. 7A to 7C, schematic diagrams showing the panel substrate being cut by the substrate cutting apparatus according to a second embodiment of the present invention are illustrated. Referring to FIG. 7A again, when cutting off the first residual material 204 and the second residual material 205, first, the panel substrate 201 is transported to the pre-cutting unit 220 by the transporting unit 210 for pre-cutting off the first residual material 204 and the second residual material 205 of the panel substrate 201.

Referring to FIG. 7B again, when cutting off the third residual material 206 and the fourth residual material 207 and cutting the panel substrate 201 into the elongated substrates 202, first, the panel substrate 201 is transported to the first cutting unit 230 by the transporting unit 210. Subsequently, the transporting unit 210 can transport the panel substrate 201 along a feed direction. At this time, the first cutting unit 230 is utilized to cut the panel substrate 201 repeatedly along a first cutting direction, thereby cutting off the third residual material 206 and the fourth residual material 207 and cutting the panel substrate 201 into the elongated substrates 202.

Referring to FIG. 7C again, when cutting each of the elongated substrates 202 into the panel units 203, the transporting unit 210 can transport the elongated substrates 202 to the second cutting unit 240. Subsequently, cutter heads 241 (referring to FIG. 4D) of the second cutting unit 240 can cut each of the elongated substrates 202 repeatedly along a second cutting direction, so as to obtain the panel units 203, wherein the second cutting direction of the second cutting unit 240 is vertical to the first cutting direction of the first cutting unit 230. Subsequently, the detector 150 is utilized to detect the cut panel units 203.

The residual materials 204, 205 at both sides of each of the elongated substrates 202 have been cut off previously and efficiently by the pre-cutting unit 220, thereby omitting steps of cutting residual materials of each of the elongated substrates 202. Therefore, the substrate cutting apparatus 200 of the present embodiment can pre-cut off the residual materials around the panel substrates 201 efficiently for greatly reducing the steps and required time for cutting the panel substrate. For example, in the second embodiment, a tact time for cutting the substrate can be reduced from 18.12 seconds to 14 seconds, thereby obtaining a raise of 22.7% of the cutting efficiency.

As described above, the method and the substrate cutting apparatus for cutting the panel substrate of the present invention can pre-cut off the residual materials around the panel substrates efficiently, so as to simplify the following steps for cutting the panel substrate, hence greatly reducing the required time for cutting.

The present invention has been described with a preferred embodiment thereof and it is understood that many changes and modifications to the described embodiment can be carried out without departing from the scope and the spirit of the invention that is intended to be limited only by the appended claims.

The invention claimed is:

1. A method for cutting a panel substrate into a plurality of panel units, wherein the panel substrate is a glass substrate, and the method comprises the following steps:
   before cutting the panel substrate into a plurality of elongated substrates, utilizing a first cutting unit to cut off a first residual material and a second residual material at two opposite sides of the panel substrate;
   before cutting the panel substrate into the plurality of elongated substrates and after cutting off the first residual material and the second residual material, cutting off a third residual material and a fourth residual material at another two opposite sides of the panel substrate;
   after cutting off the first residual material, the second residual material, the third residual material, and the fourth residual material, cutting the panel substrate into the plurality of elongated substrates; and
   cutting each of the elongated substrates into the panel units;
   wherein, when cutting off the first residual material, the panel substrate is transported to a rotatable stage, and then the panel substrate is fixed and held by the rotatable stage and the first cutting unit, and the first residual material at a first side of the panel substrate is cut off by the first cutting unit, and after using the first cutting unit to cut off the first residual material, the panel substrate fixed by the rotatable stage and the first cutting unit is released, and the rotatable stage is utilized to rotate the panel substrate by 180° for cutting off the second residual material.

2. The method according to claim 1, further comprising the following steps:
   when cutting off the third residual material and the fourth residual material and cutting the panel substrate into the elongated substrates, the panel substrate is rotated by 90°; and
   utilizing the first cutting unit to cut the panel substrate, so as to cut off the third residual material and the fourth residual material and cut the panel substrate into the elongated substrates.

3. The method according to claim 1, wherein a second cutting unit is utilized to cut each of the elongated substrates into the panel units.

4. The method according to claim 1, wherein the first residual material and the second residual material is cut off by a pre-cutting unit.

* * * * *